(No Model.)
I. JACKSON.
BELT FASTENER.
No. 390,233. Patented Oct. 2, 1888.
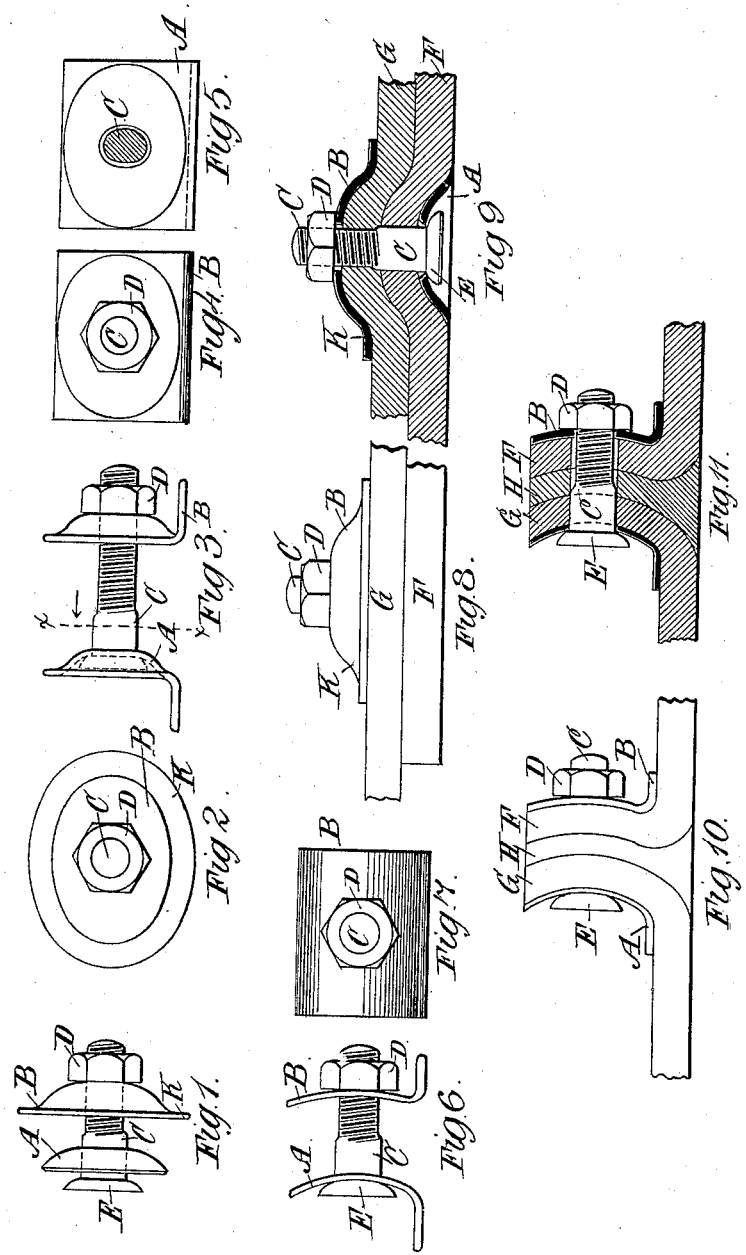
Witnesses:
Wm. A. Rosenbaum
G. H. Stockbridge
Inventor:
Isaac Jackson
by his Atty. W. J. Johnston

UNITED STATES PATENT OFFICE.

ISAAC JACKSON, OF GLOSSOP, COUNTY OF DERBY, ENGLAND.

BELT-FASTENER.

SPECIFICATION forming part of Letters Patent No. 390,233, dated October 2, 1888.

Application filed March 24, 1888. Serial No. 268,339. (No model.) Patented in England August 13, 1887, No. 11,065.

*To all whom it may concern:*

Be it known that I, ISAAC JACKSON, a subject of the Queen of Great Britain, residing at Glossop, in the county of Derby and Kingdom of England, have invented certain new and useful Improvements in Fasteners for Belts, (for which I have received Letters Patent in England, No. 11,065, dated August 13, 1887;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to apparatus for connecting together the ends of driving bands or belts; and its objects are to improve and simplify such joints or connections and to render them more durable.

The fastener constructed according to these improvements consists of two plates or washers, a bolt, and a nut or a cotter. Each washer or plate is stamped or pressed so that it is concave on one side and convex on the other. In making a joint a hole is made through the double belt and the washers are placed with the convex side of one and the concave side of the other next to the opposite surfaces of the belt. The bolt is then passed through the hole and the washers, and the whole is screwed up or secured by a cotter. By this means the two washers are drawn together, and that portion of the belt between them is forced out of line with the rest of the belt and enters the concave washer. An improved grip is thus obtained, the strain being distributed over the area of the washers. The washer with the convex gripping-surface next to the belt, hereinafter called the "convex washer," is the one which passes next to the pulley when applied to a lapped joint, and contains within its concavity the head of the bolt, which lies level with the driving-surface of the belt. To allow the bolt to oscillate or rock slightly when passing round the pulley, the hole through the convex washer may be made taper, so that its diameter next to the belt is larger than its diameter next to the bolt-head. To prevent the bolt turning during screwing up, the unscrewed part of the shank of the bolt and the hole through the convex washer are made not circular, and, by preference, oval. The concave washer is larger than the other and is provided with a flat rim all round, and is scarcely hollowed so much as the convex washer.

In the case of a "jump joint"—that is to say, a joint in which the ends of the belt are bent approximately at right angles to the rest of the belt and laid face to face—the bottom edges of the two washers are bent backward or flanged, so that there is no tendency to cut or otherwise injure the belt at the bend. Instead of using a nut, a cotter may be inserted through the bolt, which may then be made with a round or other shaped shank. I may also substitute for the convex and concave washers two trough-shaped or approximately semi-tubular plates, the concave side of one and the convex side of the other being, as before, the belt-gripping surfaces.

I have hereunto appended a sheet of drawings, to which reference is made, similar letters being used to indicate similar parts where they occur in different figures.

Figure 1 illustrates the form of fastener used for a "lap-joint." Fig. 2 is a plan of the concave washer or plate employed. Fig. 3 shows the fastener used for making a jumped joint. Fig. 4 shows the concave washer used in this type of joint. Fig. 5 is a section through line $x\ x$ of Fig. 3, and shows the convex washer perforated with an oval hole, through which passes the oval shank of the bolt to prevent turning in the washer. Figs. 6 and 7 are views of the curved or trough-shaped plates flanged for use in a jumped joint. Figs. 8 and 9 are respectively an elevation and a section of a lapped joint made by means of my improved fastener. Fig. 10 is an elevation of a jumped joint, the plates used being those shown in Figs. 6 and 7. Fig. 11 is a section either of the joint shown in Fig. 10 or of a joint made by the plates shown in Figs. 3, 4, and 5.

In all the views, A represents the convex washer or plate; B, the concave washer; C, the bolt, and D the nut. The head E of the bolt lies flush within the hollow side of the concave washer.

K, Figs. 1 and 2, is the flat rim surrounding the concave washer, so as to prevent cutting of the belt. The hole through A is tapered, and is larger on the side next to the belt F than it is on the side next to the bolt-head E. By this means the bolt C is allowed to rock or move slightly out of its normal position as the joint passes around the pulley. The same result may be attained by making the under surface of the bolt-head of slightly less curvature than the plate with which it is in contact, whether in conjunction with the tapered hole or by itself.

F and G are the ends of the belt. In Fig. 10 they are bent approximately at right angles to the rest of the belt and parallel to each other. The plates A and B are then placed one on each side of the joint and screwed up, suitable holes for the passage of the bolts having previously been formed. All danger of cutting the belt at the bends is obviated by the flanged lower edges of the plates A B.

H is a piece of felt or similar suitable material inserted between the ends F and G, so as to form a continuous driving surface by means of its lower edge.

Having now described my invention, what I claim is—

1. The belt-fastener herein described, consisting of a bolt, a cupped or curved washer having the convex side toward the belt, a second cupped or curved washer having its concave side toward the belt, and a nut or cotter, substantially as and for the purpose set forth.

2. The belt-fastener consisting of a bolt, two cupped or curved washers, and a nut or cotter, the lower ends of the washers being flanged, substantially as and for the purpose set forth.

3. The belt-fastener consisting of two cupped or curved washers and a nut or cotter, and a bolt having a non-circular and preferably oval stem, in combination with a similarly-shaped hole in the washer next to the bolt-head, substantially as hereinbefore described.

4. The belt-fastener consisting of a bolt, a nut or cotter, a cupped or curved washer, the concave side of which is placed against the belt and which is formed or provided with a flat surrounding rim, and another washer, the convex side of which is next to the bolt, substantially as and for the purpose set forth.

In testimony whereof I affix my signature in presence of two witnesses.

ISAAC JACKSON.

Witnesses:
ROBT. MATHIESON,
WILLIAM E. HEYS.